(12) United States Patent
Seo

(10) Patent No.: US 11,850,881 B2
(45) Date of Patent: Dec. 26, 2023

(54) FLOOR DECORATION TILE MANUFACTURING SYSTEM FOR AUTOMATIC STORAGE AND SUPPLY AND AUTOMATIC AIR DUCT TYPE CONTROL OF TEMPERATURE

(71) Applicant: Jung Soo Seo, Seoul (KR)

(72) Inventor: Jung Soo Seo, Seoul (KR)

( * ) Notice: Subject to any disclaimer, the term of this patent is extended or adjusted under 35 U.S.C. 154(b) by 0 days.

(21) Appl. No.: 17/464,971

(22) Filed: Sep. 2, 2021

(65) Prior Publication Data
US 2023/0074361 A1   Mar. 9, 2023

(51) Int. Cl.
*B44C 5/04* (2006.01)
*B65H 20/34* (2006.01)
(Continued)

(52) U.S. Cl.
CPC .......... *B44C 5/04* (2013.01); *B32B 37/06* (2013.01); *B32B 37/08* (2013.01); *B32B 37/10* (2013.01); *B65H 20/34* (2013.01); *B32B 2309/02* (2013.01); *B32B 2419/04* (2013.01); *B65H 2301/5143* (2013.01); *B65H 2515/40* (2013.01);
(Continued)

(58) Field of Classification Search
CPC ........... B44C 5/04; B32B 37/06; B32B 37/08; B32B 37/10; B32B 2309/02; B32B 2419/04; B65H 20/34; B65H 2301/5143; B65H 2515/40; B65H 2701/172
See application file for complete search history.

(56) References Cited

U.S. PATENT DOCUMENTS

2018/0333942 A1 * 11/2018 Seo .................. E04F 15/107

FOREIGN PATENT DOCUMENTS

| KR | 10-2014-0058263 A | 5/2014 |
| KR | 10-2018-0126266 A | 11/2018 |
| KR | 10-2020262 B1 | 10/2019 |

* cited by examiner

*Primary Examiner* — Vishal I Patel
(74) *Attorney, Agent, or Firm* — NKL LAW; Jae Youn Kim

(57) ABSTRACT

Disclosed is a floor decoration tile manufacturing system for automatic storage and supply and automatic air duct type control of temperature, the floor decoration tile manufacturing system including: a raw material supply unit configured to store a raw material for forming a lower sheet and a middle sheet; a lower sheet supply unit configured to form and supply the lower sheet; a middle sheet supply unit configured to supply the middle sheet bonded onto the lower sheet; a main roller configured to bond the lower sheet and the middle sheet, which have been supplied; a first sheet supply unit configured to supply a print sheet having a color or a pattern to the main roller; a second sheet supply unit configured to supply a transparent sheet, which is bonded onto the print sheet, to the main roller; and a control unit configured to control a tile manufacturing process through pressing the main roller by controlling the driving speeds of the raw material supply unit, the lower sheet supply unit, and the middle sheet supply unit and rotation of the main roller such that the print sheet and the transparent sheet which have been supplied to the upper side, to which the lower sheet and the middle sheet are bonded, are sequentially pressed, wherein the control unit controls the heating temperatures for the raw material, the lower sheet, the middle sheet, and the tile manufacturing sections.

4 Claims, 7 Drawing Sheets

(51) Int. Cl.
B32B 37/08 (2006.01)
B32B 37/06 (2006.01)
B32B 37/10 (2006.01)

(52) U.S. Cl.
CPC .................. *B65H 2701/172* (2013.01); *B65H 2701/1938* (2013.01)

FLOOR DECORATION TILE MANUFACTURING SYSTEM FOR AUTOMATIC STORAGE AND SUPPLY AND AUTOMATIC AIR DUCT TYPE CONTROL OF TEMPERATURE

BACKGROUND OF THE INVENTION

1. Field of the Invention

The present invention relates to a floor decoration tile manufacturing system for automatic storage and supply and automatic air duct type control of temperature, and more particularly to a technology of continuously producing tiles without stopping a sheet storing process, a sheet feeding process, and a sheet joining process due to heating of sheets by dispersing a heating process accompanied when the tiles are manufactured through pressing of the sheets to the sheet storing process, the sheet feeding process, and the sheet joining process that cover the supply of the sheets to the manufacturing of the tiles.

2. Description of the Prior Art

In general, flooring such as floor paper or tiles is constructed on a floor of a building, and the main material of the flooring such as floor paper or tiles is vinyl chloride that is light, flexible, and excellent in a cushioning property and a noise absorbing property.

The floor decoration material mainly formed of vinyl chloride includes a base layer generally mainly formed of a PVC resin, a printing layer is formed on the base layer, and a transparent film layer is formed on the printing layer. Then, if necessary, a coating layer for improving an anti-wear property and an anti-scratch property may be further formed at an upper end of the transparent film layer.

Then, the substrate layer includes a PVC resin, which is a main material thereof, a filler, and a plasticizer, and the transparent film layer may be manufactured only of a PVC resin without using a filler. The floor decoration material having the above configuration is used alone in a process of finishing the floor, or is used after being attached with various types of adherends or adhesives.

However, the floor decoration material of the structure includes A: a wear-resistant curing agent UV coating agent layer, B: a transparent film layer, and C: a printed layer at an upper portion thereof, and includes D: a single structure at a lower portion thereof and because the physical properties of the layers A, B, and C and the physical property of single layer D are different if the floor decoration material is manufactured in this state, the contraction/expansion rates of the upper layer and the lower layer are different after the floor material is constructed, whereby deformation such as distortion or coming over occurs.

In order to solve the problems, Korean Patent Application Publication No. 10-2018-0126266 (entitled 'Floor Decoration Tile Manufacturing Apparatus') discloses a lower sheet supply unit that forms and supplies a lower sheet; a middle sheet supply unit that supplies a middle sheet joined to an upper portion of the lower sheet; a material supply unit that supplies materials, which the contents of fillers are different, to the lower sheet supply unit and the middle sheet supply unit; a main roller that receives the lower sheet and the middle sheet such that the lower sheet and the middle sheet are joined to each other; a first sheet supply unit that supplies a print sheet having a color or a pattern to the main roller; a second sheet supply unit that supplies a transparent sheet to the main roller; and an ultraviolet ray coating unit that forms an ultraviolet ray coating layer on a surface of the transparent sheet.

However, according to the prior patent, because the speed, at which the main roller joins the lower sheet and the middle sheet supplied, and the speeds, at which the lower sheet and the middle sheet are supplied, frequently stop the continuous supply of a calendar that produces the sheets, the pressing to production apparatus also is stopped.

In order to solve the problems, the apparatus can be prevented from being stopped and can be continuously produced by installing an automatic storage supply and air duct type temperature control apparatus at an intermediate part, to which the sheet is supplied, such that a marginal part of the storage apparatus is used when the entrance of the sheet is stopped and the production is adjusted to a value that is more or less than the amount of the used sheet when the entrance of the sheet is resumed.

Further, according to the conventional tile manufacturing process, a sheet having a predetermined thickness is produced by a calendar, continuously passes through cooling rollers such that the temperature of the sheet becomes 15° C. (±5° C.), is produced in an original mark state, is separately stored, and is supplied to an inline system to be heated by an electric furnace. Then, because the sheet is heated to a temperature, at which it may be bonded, of 162° C., a lot of time is consumed for conduction heating to increase the temperature of the sheet from 15° C. to 147° C.

Accordingly, high-speed production is impossible, and high electricity fee, high labor costs, and high installation costs are caused for heating.

Accordingly, the applicant provides a floor decoration tile manufacturing system that can shorten a heating time by supplying sheets of different physical properties after lowering the temperatures of the sheets, primarily reheating the sheets to preset temperatures when the sheets are output from supply units, secondarily reheating the sheets to temperatures, at which the sheets may be bonded to each other, when the sheets are bonded to each other, and dispersing a storing process, a feeding process, a joining process, and a pressing process that cover the supply of the sheets to the manufacturing of the tiles, and can continuously produce tiles without stopping the sheet storing process, the sheet feeding process, and the sheet joining process due to the heating of the sheets.

PRIOR TECHNICAL DOCUMENTS

Patent Documents (Patent Document 1) Korean Patent Application Publication No. 10-0126266 (Nov. 27, 2018)

SUMMARY OF THE INVENTION

The present invention provides a floor decoration tile manufacturing system that can shorten a heating time by supplying sheets of different physical properties after lowering the temperatures of the sheets, primarily reheating the sheets to preset temperatures when the sheets are output from supply units, secondarily reheating the sheets to temperatures, at which the sheets may be bonded to each other, when the sheets are bonded to each other, and dispersing a storing process, a feeding process, a joining process, and a pressing process that cover the supply of the sheets to the manufacturing of the tiles, and can continuously produce tiles without stopping the sheet storing process, the sheet feeding process, and the sheet joining process due to the heating of the sheets The present invention also provides a technology, by which the sheets can be always continuously supplied at the predetermined locations without stopping the sheet storing process, the sheet feeding process, the sheet joining process, and the sheet pressing process by measuring the extension lengths of the sheets supplied into the supply units through the laser sensors provided at the lower ends of the supply units to control the supply speeds of the sheets.

The present invention also provides a technology of supplying cooling water cooled by a freezer during a sheet manufacturing process to cool rollers while continuously rotating the rollers and thus cooling the sheets extended by high heat of 162° C. (±5° C.) to 110° C. (±5° C.) that is suitable for manual feeding, thereby continuously producing uniform products while introducing the product to a storage device.

The present invention protects individual laser sensors for the purpose of maintaining the laser sensors (a maximum heat-resistant temperature of 65° C.) at less than 50° C. even at 130° C. (±5° C.) that is the internal temperature of the storage device on an upper layer and a lower layer. In order to prevent steaming-up of an irradiation surface due to vaporization of a plasticizer, rectangular glass that may be fed lengthwise is installed at an upper end of a sensor and thus the glass can be easily replaced frequently after it is used three times in a row. In order to prevent steaming-up of an upper end of the glass, an individual duct and a sensor module are installed in order that natural air outside the interior may be made to continuously pass through the upper ends of the glasses with a strong wind speed through an individual fan blower and an air duct so that steaming-up generated in the sheets of the storage device due to the plasticizer vaporized due to the high heat.

In accordance with an aspect of the present invention, there is provided a floor decoration tile manufacturing system for automatic storage and supply and automatic air duct type control of temperature, the floor decoration tile manufacturing system including: a raw material supply unit configured to store a raw material for forming a lower sheet and a middle sheet; a lower sheet supply unit configured to form and supply the lower sheet; a middle sheet supply unit configured to supply the middle sheet bonded onto the lower sheet; a main roller configured to bond the lower sheet and the middle sheet, which have been supplied; a first sheet supply unit configured to supply a print sheet having a color or a pattern to the main roller; a second sheet supply unit configured to supply a transparent sheet, which is bonded onto the print sheet, to the main roller; and a control unit configured to control a tile manufacturing process through pressing the main roller by controlling the driving speeds of the raw material supply unit, the lower sheet supply unit, and the middle sheet supply unit and rotation of the main roller such that the print sheet and the transparent sheet which have been supplied to the upper side, to which the lower sheet and the middle sheet are bonded, are sequentially pressed, wherein the control unit controls the heating temperatures for the raw material, the lower sheet, the middle sheet, and the tile manufacturing sections.

The lower sheet supply unit and the middle sheet supply unit may generate the lower sheet and the middle sheet by simultaneously compressing raw sheets received from the raw material supply unit while allowing the raw sheets to pass between two heating rollers and supply the lower sheet and the middle sheet, which have been generated, to the main roller by feeding the lower sheet and the middle sheet to a meander structure by a wire conveyor connected to a plurality of rollers provided on the upper or lower side thereof, and a laser sensor configured to measure a distance between a bottom surface, which faces the lower sheet and the middle sheet fed to the meander structure, by irradiating an infrared ray toward the lower sheet and the middle sheet may be provided on the bottom surface.

The control unit may control the supply speeds of the lower sheet and the middle sheet by comparing the lengths of the lower sheet and the middle sheet prolonged to the bottom surfaces of the lower sheet supply unit and the middle sheet supply unit along the meander structure on the basis of measurement values received from the laser sensors provided on the bottom surfaces of the lower sheet supply unit and the middle sheet supply unit with a preset value.

The laser sensor may be configured such that the upper side of a laser irradiated surface contacts the inner bottom surfaces of the lower sheet supply unit and the middle sheet supply unit, glass having a rectangular shape fed to one side or an opposite side is provided to correspond to a control signal of the control unit, and may be connected to an air duct such that cold air introduced through a fan blower is blown.

The floor decoration tile manufacturing system may further include the lower sheet supply unit and the middle sheet supply unit further include temperature sensor provided on one side and an opposite side of the laser sensor to apply temperature values measured in real time to the control unit.

According to the present invention, the heating time can be shortened and tiles can be continuously produced without stopping the sheet storing process, the sheet feeding process, and the sheet joining process due to the heating of the sheets, by heating the sheets of different physical properties to preset temperatures such that the sheets are easily jointed to each other, supplying the sheets to the supply units, heating the sheets to present temperatures when the sheets are output from the supply units, heating the sheets to temperatures, at which the sheets may be joined to each other when the sheets are joined, and dispersing the storing process, the feeding process, the joining process, and the pressing process that cover the supply of the sheets to the manufacturing of the tiles.

According to the present invention, the sheets can be always continuously supplied at the predetermined locations without stopping the sheet storing process, the sheet feeding process, the sheet joining process, and the sheet pressing process by measuring the extension lengths of the sheets supplied into the supply units through the laser sensors provided at the lower ends of the supply units to control the supply speeds of the sheets.

According to the present invention, products can be uniformly produced by supplying cooling water cooled by the freezer during the tile manufacturing process and cooling the rollers while continuously rotating the rollers to contracting the sheets prolonged by high heat.

According to the present invention, the irradiation surfaces of the laser sensors due to heating during the tile manufacturing process can be prevented from being steamed up by blowing exterior air through the fan blower and the air duct, and the recognition rates of the laser sensors can be improved and the laser sensors can be easily maintained and repaired by providing the rectangular glass on the irradiation surfaces of the laser sensors such that the glass is feed.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE EXEMPLARY EMBODIMENTS

Detailed features and advantages of the present invention will become clearer in the following detailed description with reference to the accompanying drawings. Prior to this, the terms and wordings used in the specification and the claims should be construed to be meanings and concepts that agree with the technical spirits of the present invention with the principle that the inventor(s) can appropriately define the concepts of the terms to describe the his or her invention through the best method. Further, it is noted that a detailed description of known functions and configurations of the present invention is omitted when they make the essence of the present invention unnecessarily unclear.

Figure 1:
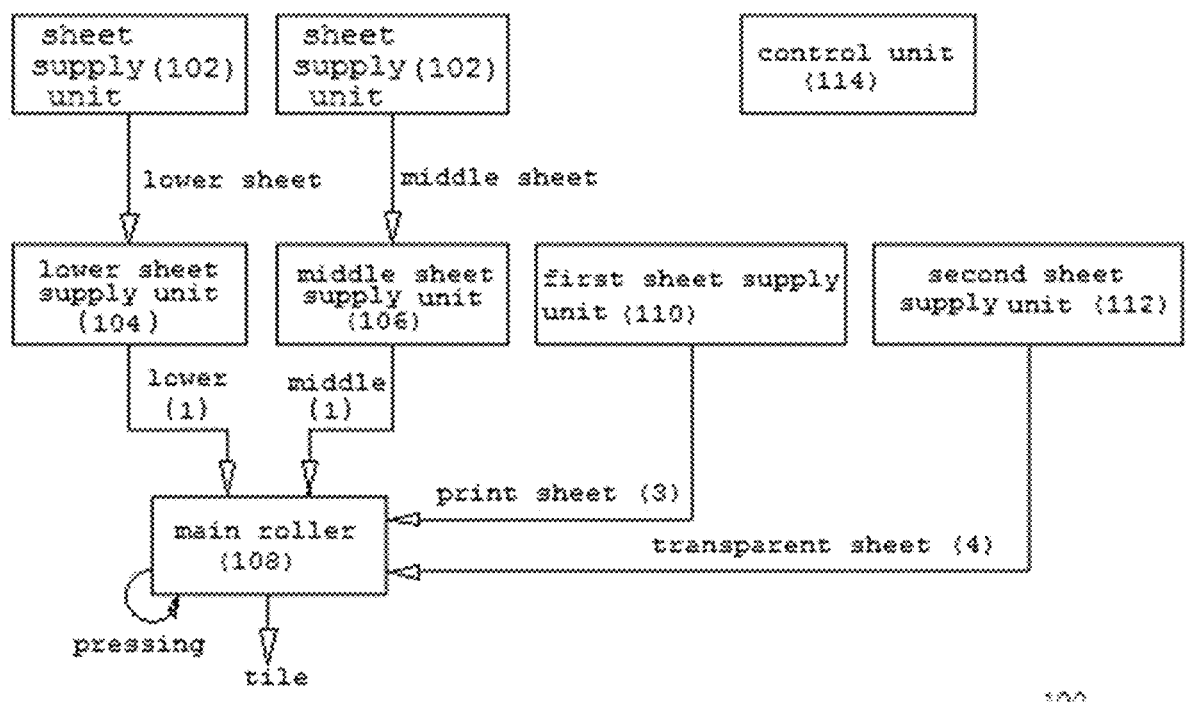
FIG. 1 is a block diagram illustrating a floor decoration tile manufacturing system for automatic storage and supply and automatic air duct type control of temperature according to an embodiment of the present invention.

As illustrated in FIG. 1, a floor decoration tile manufacturing system 100 for automatic storage and supply and automatic air duct type control of temperature according to an embodiment of the present invention includes a heating roller sheet supply unit 102 that stores a raw material for forming a lower sheet 1 and a middle sheet 2, a lower sheet supply unit 104 that forms and supplies the lower sheet 1, a middle sheet supply unit 106 that supplies the middle sheet 2 bonded onto the lower sheet 1, a main roller 108 that bonds the lower sheet 1 and the middle sheet 2, which have been supplies, a first sheet supply unit 110 that supplies a print sheet 3, on which a color or a pattern is printed, to the main roller 108, a second sheet supply unit 112 that supplies a transparent sheet, which is to be bonded onto the print sheet 3, to the main roller 108, and a control unit 114 that controls the supply speeds of the raw material, the lower sheet 1, the middle sheet 2, the print sheet 3, and the transparent sheet 4.

Then, the main roller 108 is rotated such that the print sheet 3 and the transparent sheet 4, which have been supplied the upper side, to which the lower sheet 1 and the middle sheet are bonded, are sequentially pressed under the control of the control unit 114, and outputs a tile.

Hereinafter, a detailed configuration of the floor decoration tile manufacturing system 100 for automatic storage and supply and automatic air duct type control of temperature according to the embodiment of the present invention will be described with reference to FIGS. 2 to 5.

Further, the heating roller sheet supply unit 102 mixes and kneads a material for the lower sheet and a material for the middle sheet that have different physical properties at a preset ratio, and uniformly supplies the mixture to the lower sheet supply unit 104 and the middle sheet supply unit 106 through upward and downward rotation of a rubber roller 102a.

Then, the sheet supply unit 102 cools the raw material sheet of the lower sheet and the raw material sheet of the middle sheet of a high temperature heated to 160° C. to 110° C. (±5° C.) through cooling of a cooling water tank 102b provided on the bottom surface of the rubber roller 102a. Accordingly, the raw material sheet of the lower sheet and the raw material sheet of the middle sheet are fed to the lower sheet supply unit 104 and the middle sheet supply unit 106 without being stuck to the rubber roller 102a. That is, the temperature of the lower ends of the raw material sheet of the lower sheet and the raw material sheet of the middle sheet are cooled from 162° C. to 110° C. (±5° C.) by continuously cooling the rubber roller 102b by using the cooling water stored in a cooling water tank 102b.

The lower sheet supply unit 104 and the middle sheet supply unit 106 heat the raw material sheet of the lower sheet and the raw material sheet of the middle sheet cooled to 110° C. (±5° C.) and supply the raw material sheet of the lower sheet and the raw material sheet of the middle sheet, which have been heated, to mesh conveyor belts 104e and 106e at a temperature of 130° C. (±5° C.).

Accordingly, by the configuration of cooling the raw material sheet of the lower sheet and the raw material sheet of the middle sheet to a preset temperature before they are supplied to the lower sheet supply unit 104 and the middle sheet supply unit 106 and reheating them again, they rapidly reach temperatures for bonding the sheets through heating while they are not stuck to the rubber roller 102a through cooling.

That is, according to the present invention, because the conventional process of, by the lower sheet supply unit 104 and the middle sheet supply unit 106, heating the raw material sheet of the lower sheet and the raw material sheet of the middle sheet received at 110° C. (±5° C.) to 130° C. (±5° C.) is performed by the heating roller sheet supply unit 102 in the previous step, the time for heating can be remarkably shortened as compared with the conventional process and the process time also can be shortened.

Further, the materials for forming the lower sheet 1 and the middle sheet 2 include polyvinyl chloride (PVC), a filler, and a plasticizer (NEO-T) for making the formed product soft. The filler is to improve the physical properties such as strength and hardness, and calcium carbonate ($CaCo_3$) called hard coal or coal stone is used as the filler, and the embodiment of the present invention is not limited thereto.

Further, the ratio of the filler mixed in the material may be changed according to the purpose and the objective thereof.

As an example, the components and ratios of the lower sheet 1 and the middle sheet 2 according to the embodiment of the present invention may be constituted in the ratios of Table 1.

TABLE 1

| Material for middle sheet | Component Ratio | Polyvinyl chloride 17.0 wt % | Filler 71.9 wt % | Plasticizer 11.1 wt % |
|---|---|---|---|---|
| Material for lower sheet | Component Ratio | Polyvinyl chloride 36.3 wt % | Filler 47.3 wt % | Plasticizer 16.4 wt % |

That is, because the physical properties of layers A, B, and C and the physical layer of single layer A are different as the conventional floor decoration material is configured such that A: a wear-resistant hardener/UV coating layer, B: a transparent film layer, and C: a printed layer are provided at an upper portion thereof and D: a single structure is provided at a lower portion thereof, according to the present invention, in order to solve the structural problems of causing deformation such as twisting or coming over due to the contraction/expansion rates of the upper layer parts and the lower layer part due to heat after construction of the floor material, the upper layer part includes A, B, and C, the middle layer part includes the middle sheet having a low contraction/expansion rate due to the components and the ratios of the lower sheet 1 and the middle sheet 2 suggested in Table 1, and the lower layer part includes the lower sheet 1 having a contraction/expansion rate that is the same as that of the upper layer part.

Moreover, when the raw material sheet of the lower sheet or the raw material sheet of the middle sheet supplied to the lower sheet supply unit 104 and the middle sheet supply unit 106 is broken while being supplied, the heating roller sheet supply unit 102 may join the raw material sheet of the lower sheet or the raw material sheet of the middle sheet, which has been being supplied, and the raw material sheet of the lower sheet or the raw material sheet of the middle sheet, which is being newly supplied, and may supply the jointed raw material sheet to the lower sheet supply unit 104 and the middle sheet supply unit 106.

Then, in a state in which a rear end of the raw material sheet of the lower sheet or the raw material sheet of the middle sheet, which has been being supplied, and a front end of the raw material sheet of the lower sheet or the raw material sheet of the middle sheet, which is being newly supplied, overlap each other, they are cut and then may be joined through a bonding material or through taping.

Figure 2:
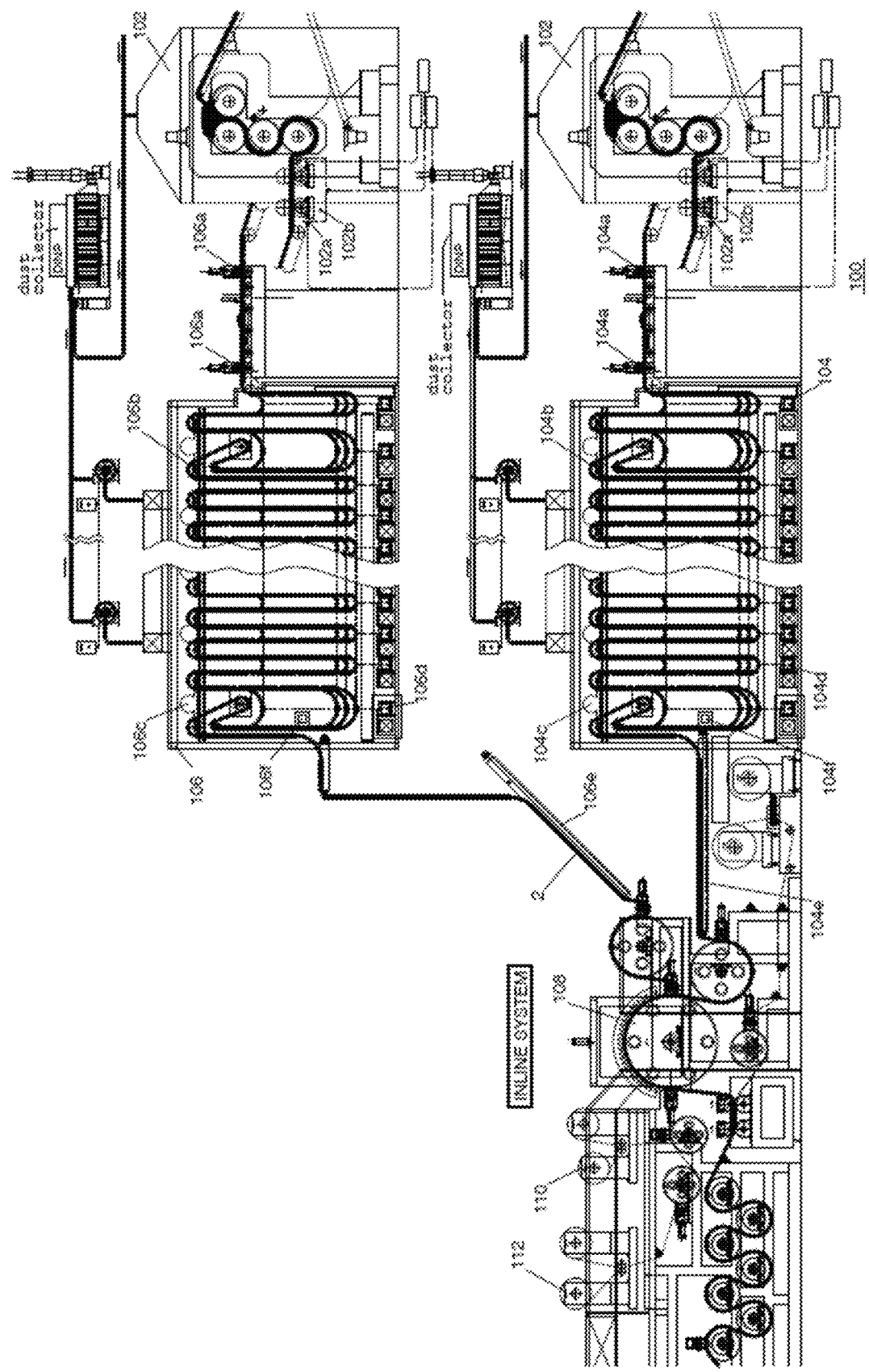
FIG. 2 is a view illustrating a detailed configuration of the floor decoration tile manufacturing system for automatic storage and supply and automatic air duct type control of temperature according to the embodiment of the present invention.
Figure 3:
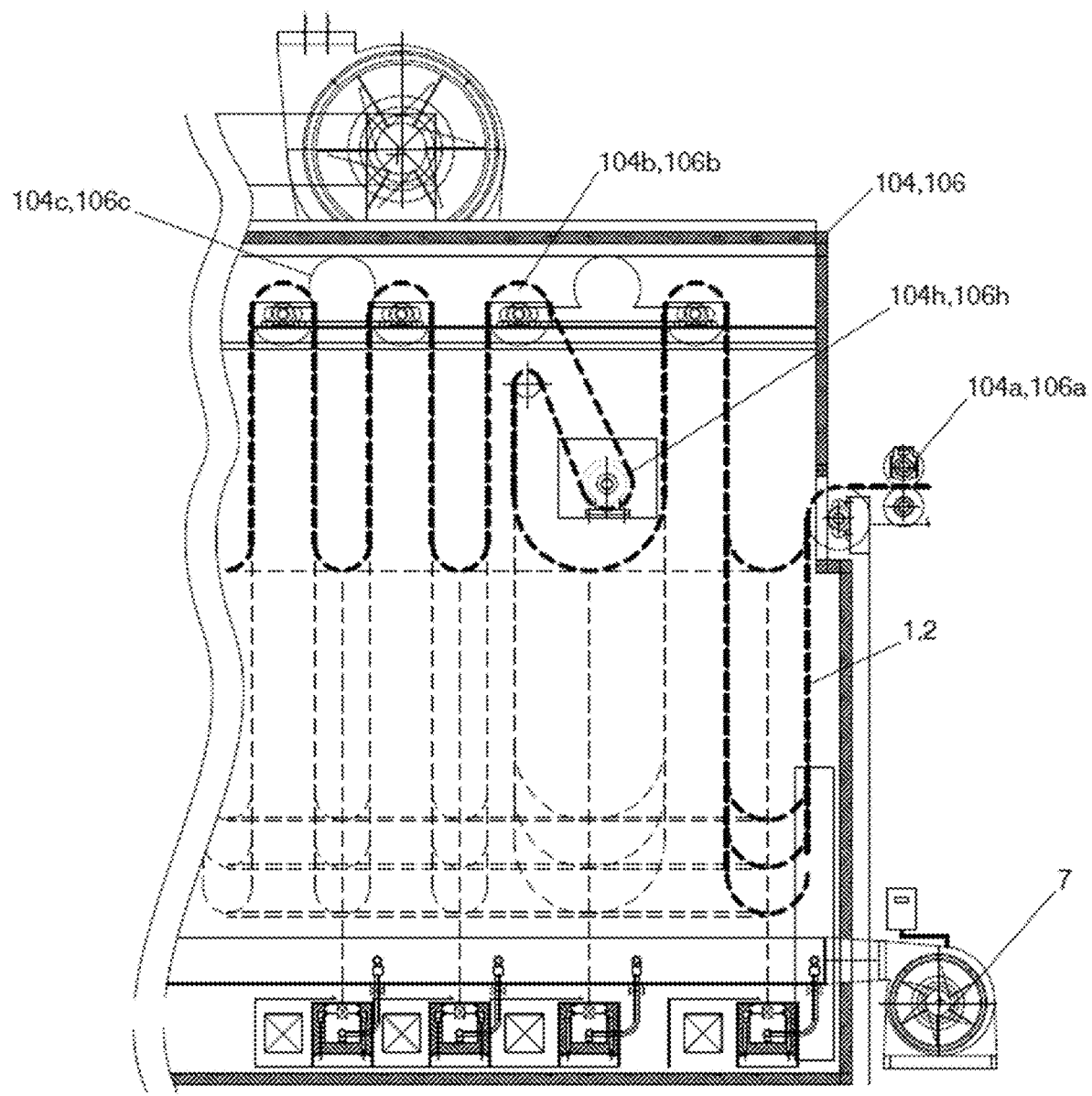
FIG. 3 is an exemplary view illustrating measurement of the lengths of a lower sheet and a middle sheet by a laser sensor of the floor decoration tile manufacturing system for automatic storage and supply and automatic air duct type control of temperature according to the embodiment of the present invention.
Figure 4:
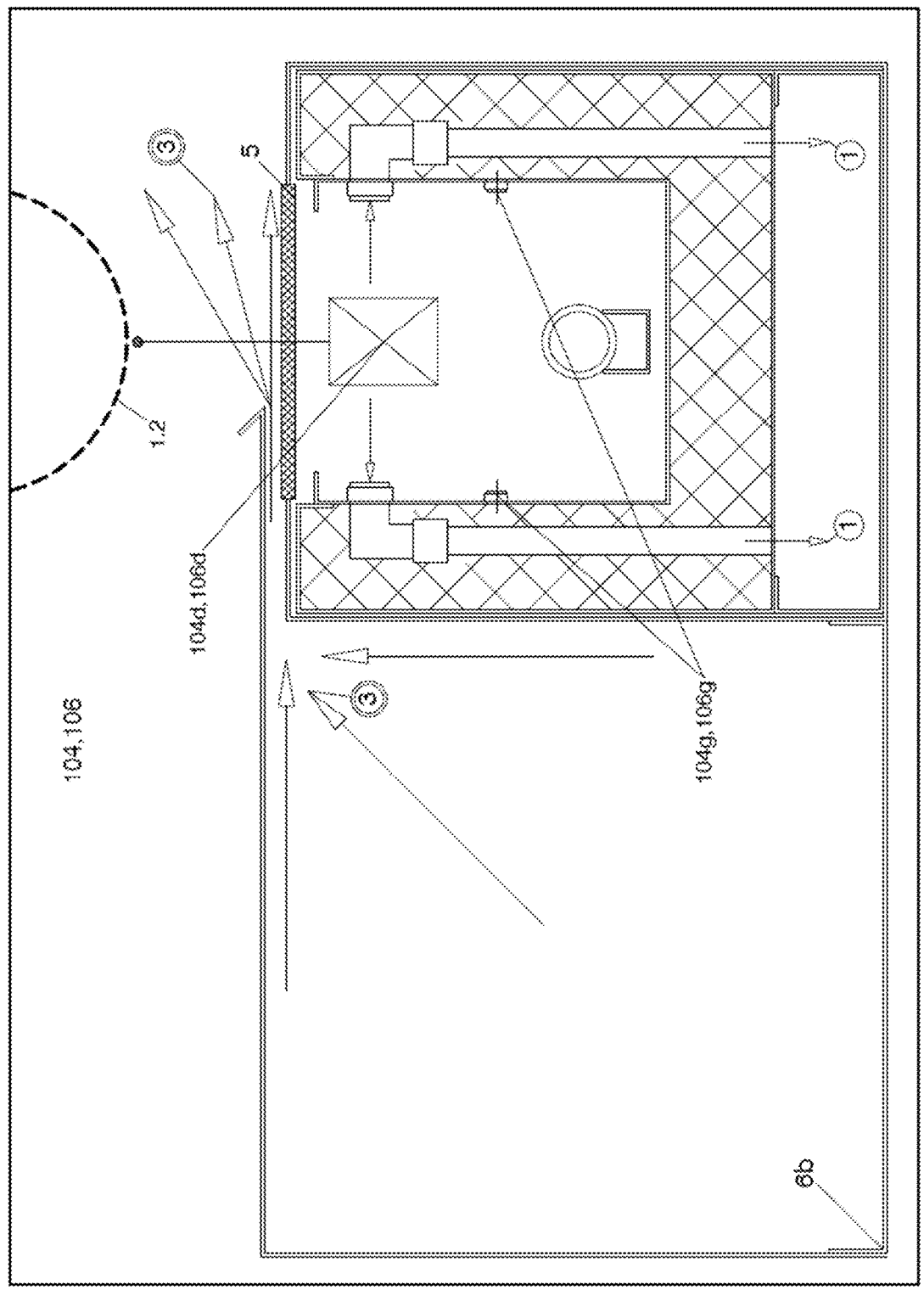
FIG. 4 is an exemplary view illustrating a laser sensor of the floor decoration tile manufacturing system for automatic storage and supply and automatic air duct type control of temperature according to the embodiment of the present invention.

Referring to FIGS. 2 and 3, the lower sheet supply unit 104 generates the lower sheet 1 by compressing the raw material sheet received from the heating roller sheet supply unit 102 while allowing the raw material sheet to pass between two rollers 104a, and supplies the lower sheet 1 to the main roller 108 by storing the lower sheet 1 in a meander structure connected to a plurality (32) of rollers 104b provided at the upper or lower side and feeding the lower sheet 1.

Here, a first temperature sensor 104f is installed in the interior of the lower sheet supply unit 104. Then, the interior temperature of the lower sheet supply unit 104 is set to 130° C. (±5° C.), and the first temperature 104f is set to 130° C. (±5° C.) to detect the interior temperature of the lower sheet supply unit 104. The first temperature sensor 104f detects the interior temperature of the lower sheet supply unit 104 in real time and transmits the detected interior temperature to the control unit 114, and the control unit 114 controls the temperature of a burner 8 (FIG. 6) according to the information of the first temperature sensor 104f. Accordingly, the lower sheet 1 stored in the lower sheet supply unit 104 can be always maintained at a preset temperature, and can be supplied to the main roller 108.

Further, a laser sensor 104d that measures a distance between the bottom surface of the lower sheet supply unit 104 and the lower sheet 1 by irradiating an infrared ray toward the lower sheet 1 is provided on the bottom surface of the lower sheet supply unit 104 that faces the lower sheet 1 fed in the meander structure.

The laser sensor 104d applies a measurement value to the control unit 114, and the control unit 114 that received the applied measurement value compares the length of the lower sheet 1 that is prolonged to the bottom surface of the lower sheet supply unit 104 according to the meander structure with a present length and controls the supply speed of the lower sheet 1.

Similarly, the middle sheet supply unit 106 also generates the middle sheet 2 by compressing the raw material sheet received from the heating roller sheet supply unit 102 while allowing the raw material sheet to pass between two rollers 106a, and supplies the middle sheet 2 to the main roller 108 by feeding the middle sheet 2 in a meander structure connected to a plurality (32) of rollers 106b provided at the upper or lower side.

Here, a first temperature sensor 106f is installed in the interior of the middle sheet supply unit 106. Then, the interior temperature of the middle sheet supply unit 106 is set to 130° C. (±5° C.), and the first temperature 106f is set to 130° C. (±5° C.) to detect the interior temperature of the middle sheet supply unit 106. The first temperature sensor 106f detects the interior temperature of the middle sheet supply unit 106 in real time and transmits the detected interior temperature to the control unit 114, and the control unit 114 controls the temperature of a burner 8 (FIG. 6) according to the information of the first temperature sensor 106f. Accordingly, the middle sheet 2 stored in the middle sheet supply unit 106 can be always maintained at a constant temperature, and can be supplied to the main roller 108.

Further, a laser sensor 106d that measures a distance between the bottom surface of the middle sheet supply unit 106 and the lower sheet 2 by irradiating an infrared ray toward the middle sheet 2 is provided on the bottom surface of the middle sheet supply unit 106 that faces the middle sheet 2 fed in the meander structure.

Further, the laser sensor 106d applies a measurement value to the control unit 114, and the control unit 114 that received the applied measurement value compares the length of the middle sheet 2 that is prolonged to the bottom surface of the middle sheet supply unit 106 according to the meander structure with a present length and controls the supply speed of the middle sheet 2.

For example, when the length of the lower sheet 1 or the middle sheet 1 measured by the laser sensor 104b and 106b is shorter than a preset reference value, the control unit 114 determines that the supply speed of the lower sheet 1 or the middle sheet 2 is high and perform a control to make the supply speed of the lower sheet supply unit 104 or the middle sheet supply unit 106 lower.

Meanwhile, when the length of the lower sheet 1 or the middle sheet 1 measured by the laser sensor 104b and 106b is longer than a preset reference value, the control unit 114 determines that the supply speed of the lower sheet 1 or the middle sheet 2 is low and perform a control to make the supply speed of the lower sheet supply unit 104 or the middle sheet supply unit 106 higher.

In this way, according to the embodiment of the present invention, because the control unit 114 can control the supply speed of the lower sheet 1 or the middle sheet 2 according to the measurement values of the laser sensors 104d and 106d, the processes of feeding and bonding the lower sheet 1 and the middle sheet 2 can be continuously performed without being stopped.

Further, the lower sheet supply unit 104 and the middle sheet supply unit 106 supply the lower metal sheet 1 and the middle sheet 2 through the mesh conveyor 104e and 106e, respectively, according to rotation control of the control unit 114.

Further, rectangular glass 5 that contact the bottom surfaces of the insides of the lower sheet supply unit 104 and the middle sheet supply unit 106 and is fed to one side or an opposite side to corresponding to a control signal of the control unit 114 is provided on the laser irradiation surfaces of the laser sensors 104d and 106d, and the laser sensors 104d and 106d are connected to an air duct (FIG. 6) to blow wind of a high temperature, which does not include a plasticizer and is introduced through a fan blower 9 of a burner 8 and are configured to prevent DINF from being adsorbed to the glass 5 through a dust collector.

In this way, because the laser sensors 104d and 106d according to the embodiment of the present invention feeds and reuses the glass 5 when foreign substances (DINP) are adsorbed to the upper side of the glass 5 by operating the apparatus for a long time, they can prevent deterioration of the performances of the laser sensors 104d and 106d and occurrence of errors.

Figure 6:
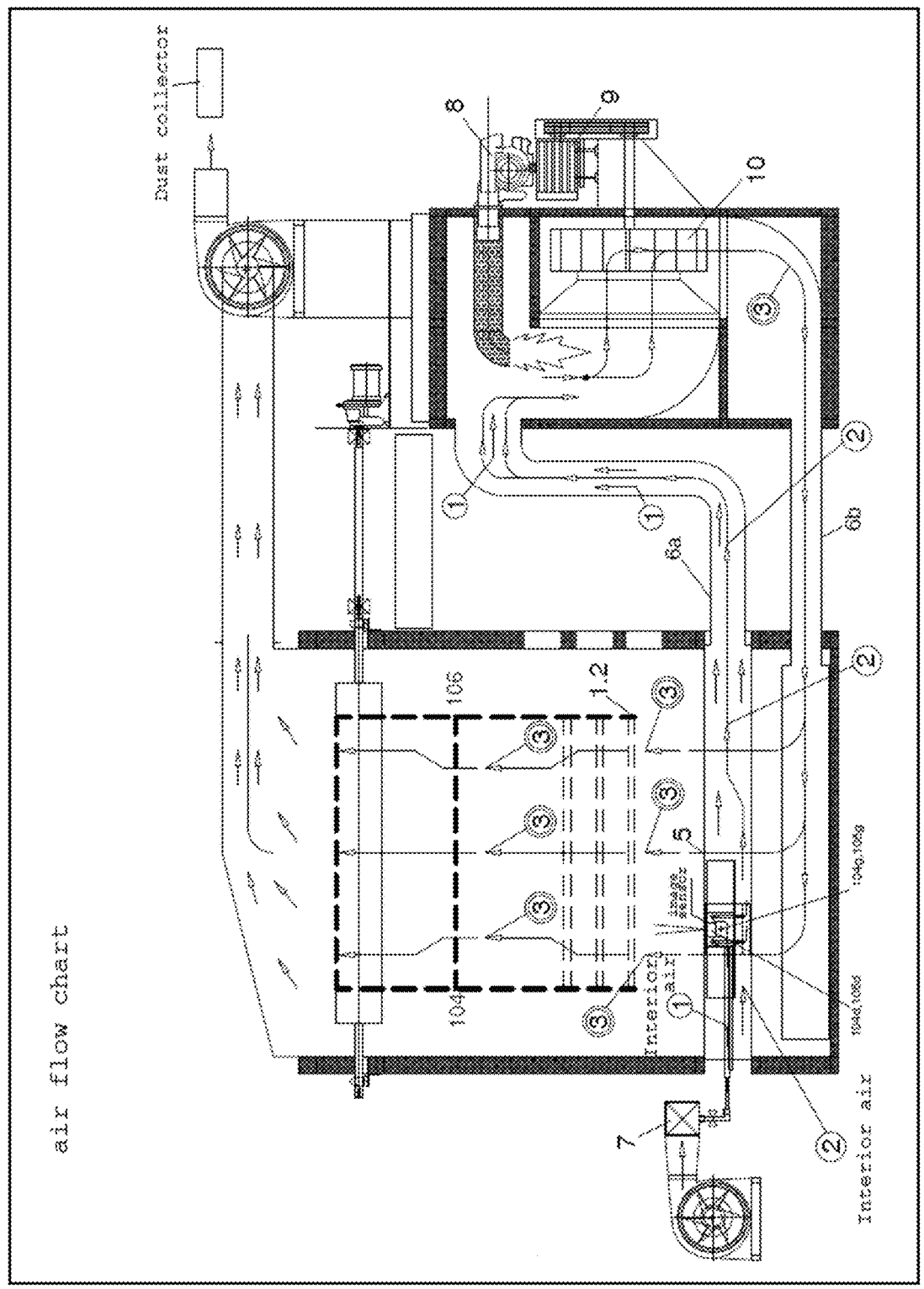
FIG. 6 is an exemplary view illustrating blowing flows of the floor decoration tile manufacturing system for automatic storage and supply and automatic air duct type control of temperature according to the embodiment of the present invention.

In addition, the laser sensors 104d and 106d are configured to be protected from heat by insulators provided to surround the laser sensors 104d and 106d, to lower the interior temperature by cold air introduced to the inner side through an interior air duct 7 of FIG. 6, and such that the heated air is discharged to the outside and circulates in a bypass form.

In this way, because glass 5 that interrupts direction contact of the lower sheet supply unit 104 and the middle sheet supply unit 106 is provided on the upper side of the laser sensors 104d and 106d, the laser sensors 104d and 106d having a heat-resistant property of 65° C. can be prevented from the heat (130° C. (±5° C.)) generated to manufacture the lower sheet 1 and the middle sheet 2, and because cold air is blown by providing the interior air duct 7 and the fan blower 10 of FIG. 6, the DINP nebulized by the heat generated to manufacture the lower sheet 1 and the middle sheet 2 can be prevented from being adsorbed to the glass 5 or being steamed up.

Figure 5:
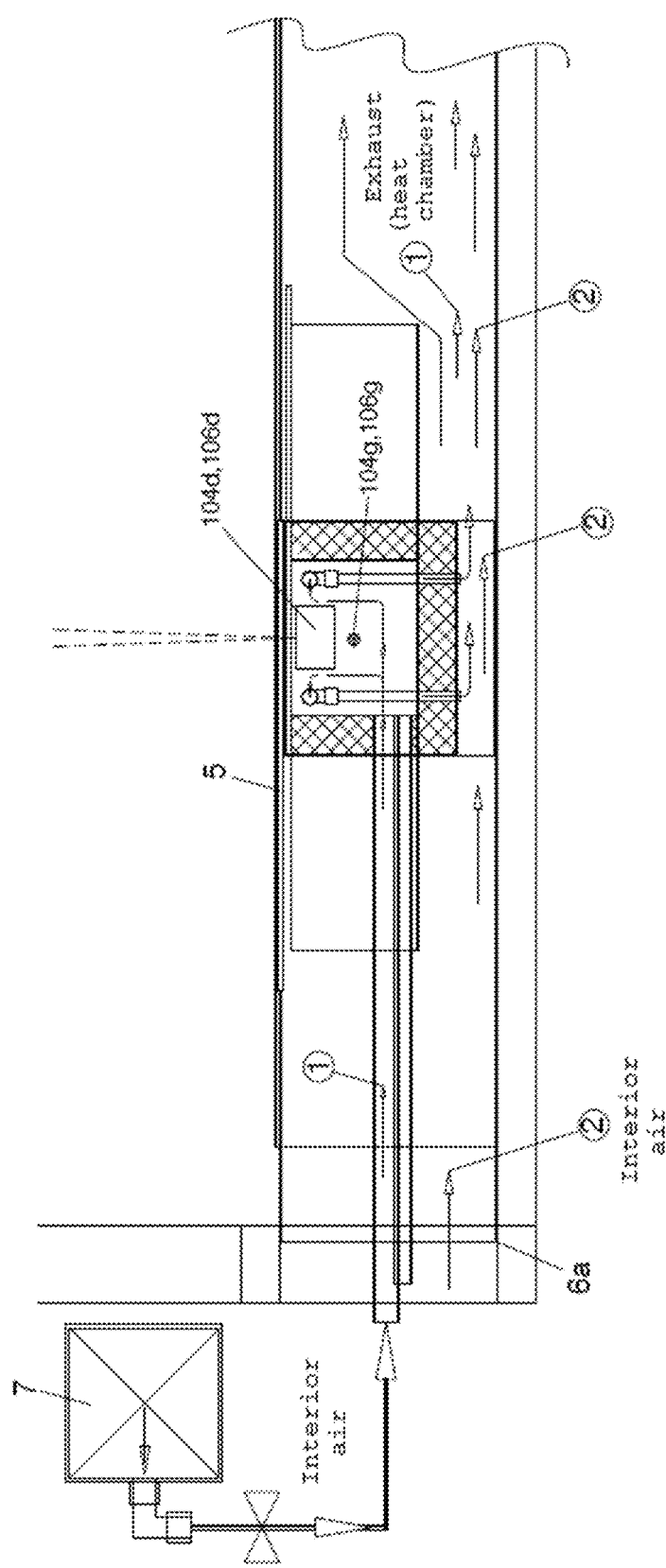
FIG. 5 is an exemplary view illustrating glass provided at an upper portion of the laser sensor and a blower structure of the floor decoration tile manufacturing system for automatic storage and supply and automatic air duct type control of temperature according to the embodiment of the present invention.

Then, as illustrated in FIG. 5, interior air is suctioned into the interior air duct 7 to control the flow rate of air to the valves, (1) warm air and (2) interior air in the interior of the modules 104g and 106g installed to maintain the temperature of the laser sensors of 50° C. (±5° C.) are suctioned into the fan blower 10 to maintain the temperatures set to the temperature sensors 104f and 106f and are automatically controlled to preset values set by the control unit 114 of the burner 8 of FIG. 1, the air heated to a high temperature passes by the glass upper layer part 6b of FIG. 6 at a high speed through (3) at a high temperature via the duct 6b of FIG. 6 with the temperature of 130° C. (±5° C.) and the flow rate obtained by controlling the temperature and the mixed flow rate of (1) and (2) of the fan blower 9 by the control unit 114 of FIG. 1, and the high heat of (3) is discharged to the lower ends of the sheets 1.2 of the storage.

Further, the laser sensor transmits the temperature value measured in real time to the control unit 114, the control unit 114 controls the temperature for manufacturing the lower sheet 1 and the middle sheet 2 according to the temperature value, and the blowing intensity is controlled by controlling the fan blower 10 of FIG. 6. The control of the heat and the blowing intensity can be automatically or manually controlled through a valve provided.

Figure 7:
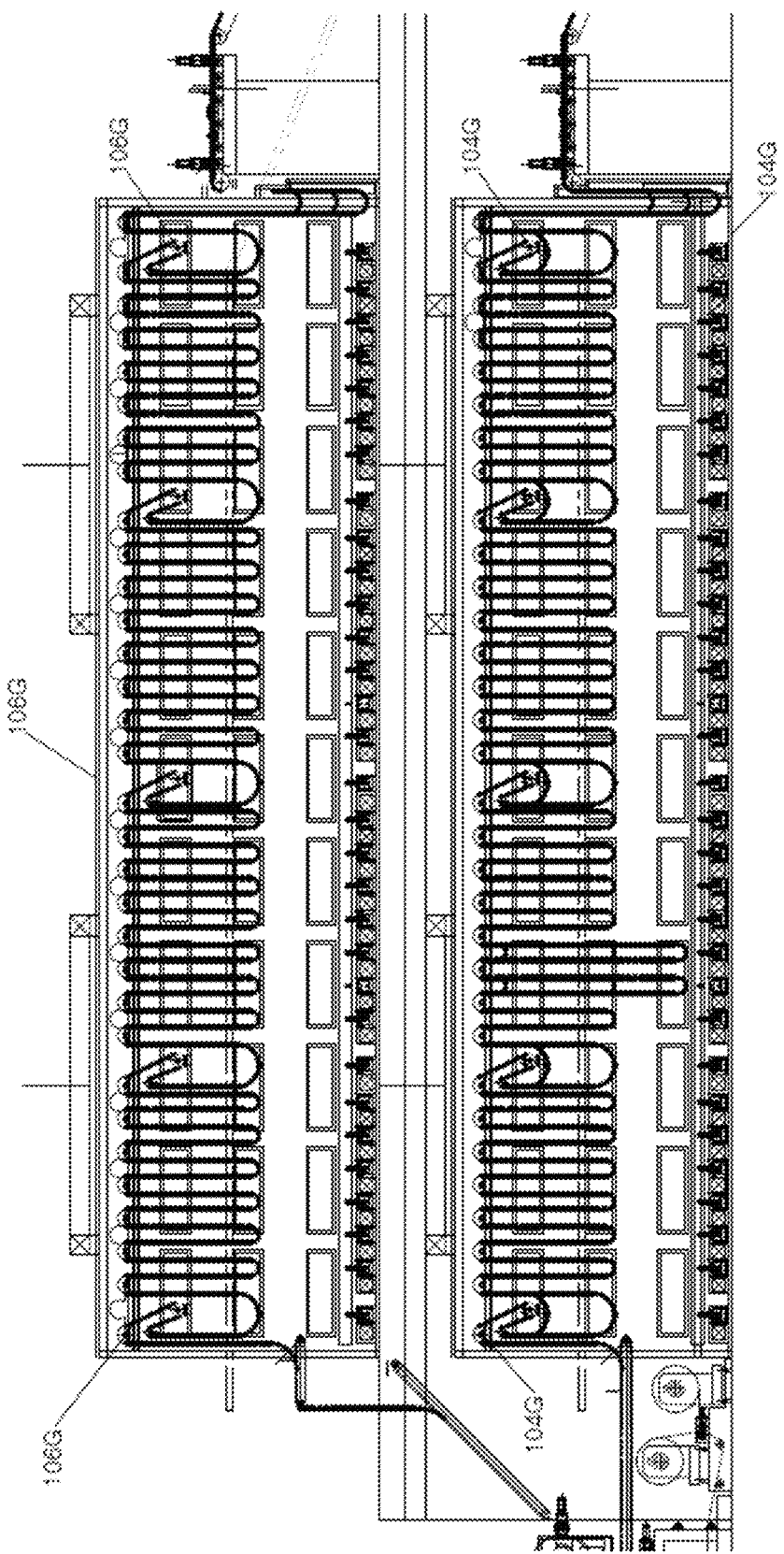
FIG. 7 is an exemplary view illustrating a location correcting module of the floor decoration tile manufacturing system for automatic storage and supply and automatic air duct type control of temperature according to the embodiment of the present invention.

Further, the lower sheet supply unit 104 and the middle sheet supply unit 106, as illustrated in FIG. 7, further includes location correcting modules (104h and 106h of FIG. 3) that correct eccentric locations by lifting the lower sheet 1 and the middle sheet 2, which are being fed, when the lower sheet 1 or the middle sheet 2 is eccentric to be biased to one side.

A plurality of location correcting modules 104h and 106h may be provided at lower ends of the rollers 104b and 106b, and the lower sheet 1 and the middle sheet 2 are driven to be always continuously supplied to specific locations after being moved to preset locations.

Further, the driving of lifting the lower sheet 1 or the middle sheet 2 by the location correcting modules 104h and 106h is performed by feeding members extracted by a predetermined length, and the feeding members are inserted after the location of the lower sheet 1 or to middle sheet 2 is corrected to the centers thereof.

The location correcting modules 104h and 106h, as illustrated in FIG. 7, are classified into fourth groups each including eighth sets of a total of 32 rollers 104b and 106b and are disposed at lower ends of the rollers 104b and 106b disposed in the first group of the four groups, and and the lower sheet 1 and the middle sheet 2 is moved to a preset location according to detection of an electrical signal to be driven to be always continuously supplied to a proper location.

Meanwhile, the main roller 108 is rotated such that the middle sheet 2 supplied through the middle sheet supply unit 106 is bonded onto the lower sheet 1 supplied from the lower sheet supply unit 104, and is rotated such that the print sheet 3 supplied from the first sheet supply unit 110 and the transparent sheet 4 from the second sheet supply unit 112 are sequentially pressed to the upper side of the lower sheet 1 and the middle sheet 2.

Then, the lower sheet 1 and the middle sheet 2 are supplied from the lower sheet supply unit 104 and the middle sheet supply unit 106 after being heated to 130° C. (±5° C.), and a tile is produced by heating the print sheet 3 and the transparent sheet 4 to 162° C., at which the sheet can be bonded to each other, through an electric thermal medium roller and an electric heater, by the main roller 108, and pressing the print sheet 3 and the transparent sheet 4.

In this way, according to the embodiment of the present invention, a time for heating the sheets to 162° C., at which the sheets can be bonded to each other, in a state in which the sheets are heated to a temperature of 130° C. (±5° C.) before the sheet bonding process, and a floor decoration tile product can be produced by pressing the sheets through the main roller only with the structure for supplying the lower sheet 1 and the middle sheet 2 having different properties. Because mass production can become possible, which is remarkable as compared with the conventional tile manufacturing process as the assembly type tile (6 mm (±1 mm) can be produced by installing two sets of presses and two sets of assembly type groove forming machines, electricity costs, manpower costs, and other costs can be remarkably saved.

Further, the main roller 108 is configured to feed a finished tile after cooling the rollers that feeds the finished tile pressed at a temperature of 162° C. through cooling water cooled by a cooler and the cooling water is discharged and recovered to the cooling tank to be supplied again. Accordingly, the time prolonged by high heat can be contracted to be formed to a uniform size.

In addition, supply assisting units (not illustrated) that guide the lower sheet 1 and the middle sheet 2 supplied such that the thicknesses thereof become uniform and hydraulically cut distal ends of the lower sheet 1 and the middle sheet 2 supplied in advance and front ends of the lower sheet 1 and the middle sheet 2 newly supplied when the supply of the lower sheet 1 and the middle sheet 2 is stopped or resumed may be further provided between the main roller 108, and the lower sheet supply unit 104 and the middle sheet supply unit 106.

The supply assisting units can replace the supply of the lower sheet 1 or the middle sheet provided in the supply assisting units when the supply of the lower sheet 1 or the middle sheet 2 is stopped due to a temporary problem, can continuously operate a production system at a section speed in proportion to the supply speed, and can reduce error rate generated as the device is operated again after being stopped.

Further, the control unit 114 controls the rotational speeds of the rollers for supplying the raw material, the lower sheet 1, the middle sheet 2, the print sheet 3, and the transparent sheet 4 according to a distance measurement value between the bottom surface of the lower sheet supply unit 104 and the lower sheet 1 and a distance measurement value between the bottom surface of the middle sheet supply unit 106 and the middle sheet 2.

Further, the control unit 114 controls the temperature of the burner according to temperature values applied in real time by the first temperature sensors 104*f* and 106*f* such that the interior temperatures of the lower sheet supply unit 104 and the middle sheet supply unit 106 are maintained at the preset temperatures, controls the heating or cooling temperatures of the lower sheet supply unit 104, the middle sheet supply unit 106, and the main roller 108 according to the temperature values applied in real time from the second temperature sensors 104*g* and 106*g*, and controls the temperatures and the blowing amounts according to the preset values of the control unit such that the lower sheet supply unit 104 and the middle sheet supply unit 106 are maintained at a constant temperature of 130° C. (±5° C.).

As described above, according to the embodiment of the present invention, the heating time can be shortened and tiles can be continuously produced without stopping the sheet storing process, the sheet feeding process, and the sheet joining process due to the heating of the sheets, by heating the sheets of different physical properties to preset temperatures such that the sheets are easily jointed to each other, supplying the sheets to the supply units, heating the sheets to present temperatures when the sheets are output from the supply units, heating the sheets to temperatures, at which the sheets may be joined to each other when the sheets are joined, and dispersing the storing process, the feeding process, the joining process, and the pressing process that cover the supply of the sheets to the manufacturing of the tiles.

Further, the sheets can be always continuously supplied at the predetermined locations without stopping the sheet storing process, the sheet feeding process, the sheet joining process, the sheet pressing process by measuring the extension lengths of the sheets supplied into the supply units through the laser sensors provided at the lower ends of the supply units to control the supply speeds of the sheets, and products can be uniformly produced by supplying cooling water cooled by the freezer during the tile manufacturing process and cooling the rollers while continuously rotating the rollers to contracting the sheets prolonged by high heat.

In addition, the irradiation surfaces of the laser sensors due to heating during the tile manufacturing process can be prevented from being steamed up by blowing exterior air through the fan blower and the air duct, and the recognition rates of the laser sensors can be improved and the laser sensors can be easily maintained and repaired by providing the rectangular glass on the irradiation surfaces of the laser sensors such that the glass is feed.

Although the preferred embodiment for exemplifying the technical spirits of the present invention has been described and illustrated, it will be well understood by an ordinary person in the art to which the present invention pertains that the present invention is not limited to the configurations and operations illustrated and described as such, and the present invention may be changed and corrected variously without departing from the scope of the technical spirits. Accordingly, it should be regarded that all changes, corrections, and equivalents also pertain to the scope of the present invention.

What is claimed is:

1. A floor decoration tile manufacturing system comprising:
    a raw material supply unit configured to store a raw material for forming a lower sheet and a middle sheet;
    a lower sheet supply unit configured to form and supply the lower sheet;
    a middle sheet supply unit configured to supply the middle sheet bonded onto the lower sheet;
    a main roller configured to bond the lower sheet and the middle sheet, which have been supplied;
    a first sheet supply unit configured to supply a print sheet having a color or a pattern to the main roller;
    a second sheet supply unit configured to supply a transparent sheet, which is bonded onto the print sheet, to the main roller; and
    a control unit configured to control a tile manufacturing process through pressing the main roller by controlling driving speeds of the raw material supply unit, the lower sheet supply unit, and the middle sheet supply unit and rotation of the main roller such that the print sheet and the transparent sheet, to which the lower sheet and the middle sheet are bonded, are sequentially pressed,
    wherein the control unit controls heating temperatures for the raw material, the lower sheet, the middle sheet, and tile manufacturing sections,
    wherein the lower sheet supply unit and the middle sheet supply unit generate the lower sheet and the middle sheet by simultaneously compressing raw sheets received from the raw material supply unit while allowing the raw sheets to pass between two heating rollers and supply the lower sheet and the middle sheet, which have been generated, to the main roller by feeding the lower sheet and the middle sheet to a meander structure by a wire conveyor connected to a plurality of rollers provided on an upper or lower side thereof, and
    wherein a laser sensor configured to measure a distance between a bottom surface, which faces the lower sheet and the middle sheet fed to the meander structure, by irradiating an infrared ray toward the lower sheet, and the middle sheet is provided on the bottom surface.

2. A floor decoration tile manufacturing system, comprising:
- a raw material supply unit configured to store a raw material for forming a lower sheet and a middle sheet;
- a lower sheet supply unit configured to form and supply the lower sheet;
- a middle sheet supply unit configured to supply the middle sheet bonded onto the lower sheet;
- a main roller configured to bond the lower sheet and the middle sheet, which have been supplied;
- a first sheet supply unit configured to supply a print sheet having a color or a pattern to the main roller;
- a second sheet supply unit configured to supply a transparent sheet, which is bonded onto the print sheet, to the main roller; and
- a control unit configured to control a tile manufacturing process through pressing the main roller by controlling driving speeds of the raw material supply unit, the lower sheet supply unit, and the middle sheet supply unit and rotation of the main roller such that the print sheet and the transparent sheet, to which the lower sheet and the middle sheet are bonded, are sequentially pressed, wherein the control unit controls heating temperatures for the raw material, the lower sheet, the middle sheet, and tile manufacturing sections, wherein the control unit controls supply speeds of the lower sheet and the middle sheet by comparing the lengths of the lower sheet and the middle sheet prolonged to bottom surfaces of the lower sheet supply unit and the middle sheet supply unit along a meander structure on the basis of measurement values received from laser sensors provided on the bottom surfaces of the lower sheet supply unit and the middle sheet supply unit with a preset value.

3. The floor decoration tile manufacturing system of claim 1, wherein the laser sensor is configured such that an upper side of a laser irradiated surface contacts inner bottom surfaces of the lower sheet supply unit and the middle sheet supply unit, and a glass having a rectangular shape fed to one side or an opposite side is provided to correspond to a control signal of the control unit, and is connected to an air duct such that cold air introduced through a fan blower is blown.

4. The floor decoration tile manufacturing system of claim 1,

Wherein one of the lower sheet supply unit and the middle sheet supply unit further comprises a temperature sensor provided on an opposite side of the laser sensor to apply temperature values measured in real time to the control unit.

* * * * *